US007010588B2

(12) United States Patent
Martin et al.

(10) Patent No.: US 7,010,588 B2
(45) Date of Patent: Mar. 7, 2006

(54) SYSTEM USING A SERIES OF EVENT PROCESSORS FOR PROCESSING NETWORK EVENTS TO REDUCE NUMBER OF EVENTS TO BE DISPLAYED

(75) Inventors: Hamish D S Martin, Edinburgh (GB); David J Stevenson, Edinburgh (GB); Robert J Duncan, Edinburgh (GB); Christopher R Linzell, Hertfordshire (GB)

(73) Assignee: 3Com Corporation, Marlborough, MA (US)

( * ) Notice: Subject to any disclaimer, the term of this patent is extended or adjusted under 35 U.S.C. 154(b) by 809 days.

(21) Appl. No.: 09/897,212

(22) Filed: Jul. 2, 2001

(65) Prior Publication Data

US 2002/0120736 A1 Aug. 29, 2002

(30) Foreign Application Priority Data

Feb. 27, 2001 (GB) .................................... 0104869

(51) Int. Cl.
*G06F 15/173* (2006.01)

(52) U.S. Cl. ....................................... 709/223; 709/224

(58) Field of Classification Search ................ 709/223, 709/224; 719/318; 707/104.1; 770/252; 714/39

See application file for complete search history.

(56) References Cited

U.S. PATENT DOCUMENTS

| | | | | |
|---|---|---|---|---|
| 5,434,872 | A | 7/1995 | Petersen et al. | 371/57.1 |
| 5,471,399 | A | 11/1995 | Tanaka et al. | 364/491 |
| 5,615,323 | A | 3/1997 | Engel et al. | 395/140 |
| 5,696,486 | A | 12/1997 | Poliquin et al. | 340/506 |
| 5,732,094 | A | 3/1998 | Petersen et al. | 371/51.1 |
| 5,751,964 | A | 5/1998 | Ordanic et al. | 395/200.54 |
| 5,819,028 | A | 10/1998 | Manghirmalani et al. | 395/185.1 |

(Continued)

FOREIGN PATENT DOCUMENTS

EP 0515296 A1 11/1992

(Continued)

OTHER PUBLICATIONS

Lenoir et al., "Real-Time Transmission Network Management and Operation Support System", Commutation & Transmission, vol. 12, No. 3, 1990, pp. 87-98.

(Continued)

*Primary Examiner*—Le Hien Luu
(74) *Attorney, Agent, or Firm*—McDonnell Boehnen Hulbert & Berghoff LLP

(57) ABSTRACT

In a network of managed devices, a method of processing network events to reduce the number of events to be displayed in an event log, comprising receiving information relating to network events, passing information regarding a network event to an event processor, determining if the information passed to the event processor relates to a type of event processed by that event processor, and if it is of such a type, processing said information if information on a related event has already been received by that event processor. The method also includes passing said information on to a further event processor if the information received does not relate to a type of event processed by said first event processor.

A set of event processors for carrying out the method is described together with a computer program, or a program on a computer readable medium loadable into a digital computer, or embodied in a carrier wave, which computer program operates in accordance with the method.

41 Claims, 7 Drawing Sheets

U.S. PATENT DOCUMENTS

| | | | | |
|---|---|---|---|---|
| 5,828,830 | A | 10/1998 | Rangaraian et al. | 395/185.01 |
| 5,923,247 | A | 7/1999 | Dowden et al. | 340/506 |
| 6,040,834 | A | 3/2000 | Jain et al. | 345/356 |
| 6,061,723 | A * | 5/2000 | Walker et al. | 709/224 |
| 6,147,974 | A | 11/2000 | Matsumoto et al. | 370/252 |
| 6,167,032 | A | 12/2000 | Allison et al. | 370/252 |
| 6,314,533 | B1 * | 11/2001 | Novik et al. | 714/39 |
| 6,366,926 | B1 * | 4/2002 | Pohlmann et al. | 707/104.1 |
| 6,438,184 | B1 | 8/2002 | Nayler | 375/345 |
| 6,446,136 | B1 * | 9/2002 | Pohlmann et al. | 719/318 |
| 6,473,407 | B1 * | 10/2002 | Ditmer et al. | 370/252 |
| 6,477,585 | B1 * | 11/2002 | Cohen et al. | 719/318 |
| 6,490,617 | B1 * | 12/2002 | Hemphill et al. | 709/223 |
| 6,526,442 | B1 * | 2/2003 | Stupek et al. | 709/224 |
| 6,571,285 | B1 * | 5/2003 | Groath et al. | 709/223 |

FOREIGN PATENT DOCUMENTS

| | | |
|---|---|---|
| EP | 0849910 A2 | 6/1998 |
| EP | 1065894 A1 | 1/2001 |
| GB | 2271918 A | 4/1994 |
| GB | 2286317 A | 8/1995 |
| GB | 2333672 | 7/1999 |
| GB | 2350035 A | 11/2000 |
| GB | 2362061 A | 11/2001 |
| GB | 2362062 A | 11/2001 |
| WO | WO 94/19888 | 9/1994 |
| WO | WO96/04755 | 2/1996 |
| WO | WO 97/31451 | 8/1997 |
| WO | WO 98/19470 | 5/1998 |
| WO | WO 00/13373 | 3/2000 |
| WO | WO 00/47003 | 8/2000 |
| WO | WO 00/72514 | 11/2000 |

OTHER PUBLICATIONS

S. Waldbusser, "Remote Network Monitoring Management Information Base", RFC 1271, Nov. 1991, pp. 1-81.

S. Waldbusser, "Remote Network Monitoring Management Information Base", RFC 2021, Jan. 1997, pp. 1-114.

Decker et al., "Definitions Of Managed Objects For Bridges", RFC: 1493, Jul. 1993, pp. 1-34.

McMaster et al., "Definitions Of Managed Objects For IEEE 802.3 Repeater Devices", RFC: 1516, Sep. 1993, pp. 1-40.

S. Waldbusser, "Remote Network Monitoring Management Information Base", RFC:1757, Feb. 1995, pp. 1-91.

McCloghrie et al., "Management Information Base For Network Management Of TCP/IP-Based Internets: MIB-II", RFC:1213, Mar. 1991, pp. 1-70.

IEEE Standard For Information Technology, "Part 2: Logical Link Control", 802.2, 1998, pp. i-239.

IEEE Standard For Information Technology, "Part 2: Carrier Sense Multiple Access With Collision Detection (CSMA/CD) Access Method and Physical Layer Specifications", 802.3, 2000, pp. i-1515.

* cited by examiner

TRADITIONAL EVENT REPORTING

| DEVICE | DESCRIPTION |
|---|---|
| SERVER_1 | FTP PERFORMANCE IS POOR |
| SERVER_2 | SMTP PERFORMANCE IS POOR |
| SERVER_1 | HTTP PERFORMANCE IS POOR |
| SERVER_5 | SMTP PERFORMANCE IS POOR |
| SERVER_1 | SMTP PERFORMANCE IS POOR |
| SERVER_2 | FTP PERFORMANCE IS POOR |
| SERVER_2 | HTTP PERFORMANCE IS POOR |
| SERVER_5 | FTP PERFORMANCE IS POOR |

CORRELATED REPORTING

| DEVICE | DESCRIPTION |
|---|---|
| SERVER_1 | SERVER IS SLOW |
| SERVER_2 | SERVER IS SLOW |
| SERVER_5 | SERVER IS SLOW |

Fig.5

SYSTEM USING A SERIES OF EVENT PROCESSORS FOR PROCESSING NETWORK EVENTS TO REDUCE NUMBER OF EVENTS TO BE DISPLAYED

REFERENCE TO RELATED CASES

Reference may be made to the assignee's related patent applications filed concurrently herewith which are hereby incorporated herein;

U.S. patent application Ser. No. 09/897,518 filed on Jul. 2, 2001 entitled "APPARATUS AND METHOD FOR PROCESSING DATA RELATING TO EVENTS ON A NETWORK", now pending.

U.S. patent application Ser. No. 09/897,381 filed on Jul. 2, 2001 entitled "NETWORK MANAGEMENT APPARATUS AND METHOD FOR PROCESSING EVENTS ASSOCIATED WITH DEVICE REBOOT", now pending.

U.S. patent application Ser. No. 09/897,232 filed on Jul. 2, 2001 entitled "NETWORK MANAGEMENT APPARATUS AND METHOD FOR DETERMINING NETWORK EVENTS", now pending.

BACKGROUND OF THE INVENTION

The present invention relates to a method and apparatus for processing network events to reduce the number of events to be displayed to an interested user (e.g. displayed on a screen or printed on a printed sheet).

Network management applications commonly monitor a number of conditions on the network. If the application detects unusual or undesirable conditions, it creates an event. In the context of this invention an 'event' is a record which describes a condition on the network which has been detected. A list of the detected events is displayed to a user in an event log. This event log is intended to be of assistance to the user of the application in diagnosing problems with the network.

The event log is normally accessible from either a processor forming part of the network controller such as the server itself, or on a network manager's computer or workstation. The event log comprises a list of events which have been detected on the network which should be drawn to the attention of the network manager. Generally speaking, these events are problems which have occurred with the network as is well known. Thus the problem may be with the particular devices on the network, or on the links between the devices.

However, typically a single problem with the network can produce a several unusual or undesirable conditions and thus several events are displayed to the user. For example, a fault with one link may cause events (errors) to be shown in respect of many devices and links linked to that link although there is only one problem, i.e. the problem with that link. This can make it difficult for the user to diagnose the actual problem.

FIG. 1 shows the standard method for displaying events. Events are produced by a number of sources within the application and are immediately displayed in the event log.

Typically, a network management system will use a number of methods for deciding when to produce an event. One technique commonly used is for the network management system to send an 'ICMP ping' (ICMP is "internet control management protocol") to a network device. If the device does not respond to the ping then the network device may well not be functioning properly and so an event is created. Another technique is to use SNMP ("simple network management protocol") to retrieve information from a network device. If the values retrieved via SNMP indicate an unusual condition then an event is created. A third technique is to create an event whenever the network management system receives an 'SNMP trap'. These are sent to the network management system by network devices if the network device detects an unusual occurrence on the network.

Network management systems commonly monitor a number of metrics on a network link in order to spot when a problem occurs. These metrics are usually based upon standard MIB variables (see rfc 1757—Remote Network Monitoring Management Information Base Version, rfc 1213—Management Information Base for Network Management of TCP/IP-based Internets, rfc 1493—Definition of Managed Objects for Bridges, rfc 1516—Definition of Managed Objects for 802.3 Repeater Devices). Each metric has a threshold associated with it and if the value exceeds this threshold an event is generated.

Two assumptions are made about 'events'.

Firstly, if a condition is detected on the network and an event is generated, then the network management system will not generate another event until the condition which caused the first event has disappeared. This means for example, that if a device stops responding to ICMP pings, then only one event is generated to record this fact. A second event is only generated if the device starts responding again and then stops responding again.

The second assumption is that it is always possible to determine if an event is 'resolved'. An event is considered to be 'resolved' if the original condition which caused the event has gone away.

Note that with minor modification the preferred method of the invention is applicable to systems which do not conform to these assumptions; these assumptions are merely made to clarify and simplify the description of the invention.

SUMMARY OF THE INVENTION

This invention describes a method for manipulating the information displayed in the event log or list about events. Thus, before the events are stored or displayed in the event log, events that are not of interest to the user may be eliminated so as not to be displayed so that only more meaningful events are displayed in the event log. This increases its usefulness to the user.

According to a first aspect the present invention provides a method of processing network events to reduce the number of events to be displayed, comprising:

receiving information relating to network events, passing information regarding a network event to an event processor, determining if the information passed to the event processor relates to a type of event processed by that event processor, and if it is of such a type, processing said information if information on a related event has already been received by that event processor.

According to a further aspect of the invention there is provided a method of processing network events to reduce the number of events to be displayed, comprising:

receiving information relating to network events, passing information regarding a network event to an event processor, determining if the information passed to the event processor relates to a type of event processed by that event processor, and processing said information in the first event processor if the information received relates to a type of event processed by said first event processor, and passing said information on to a further event processor if the information received does not relate to a type of event processed by said first event processor.

The method may include monitoring said network to determine network events. The network is preferably monitored using ICMP ping or SNMP.

Said processing step preferably includes processing said information by discarding the information if an event of greater informational value to a user has already been logged or processed by that event processor.

Said processing step includes preferably processing said information by discarding the information if information on a related event has been received by that event processor within a predetermined preceding period of time.

Preferably said method includes displaying the information and the discarding of the information in the processing step comprises not displaying that information.

Preferably said method includes the steps of, on receipt of a new event, determining if the new event is one of potentially related events;

if it is not, passing the event information to the next event processor or an event log for display;

if it is, determining if there is already an event outstanding on the link to which the event relates;

if there is not already an event outstanding on the link to which the event relates, passing the event information to the next event processor or the event log for display.

if there is already an event outstanding on the link to which the event relates, determining if the informational value of the new event is greater than the informational value of the equivalent event in the event log;

if the informational value of the new event is not greater than the informational value of the equivalent event in the event log, discarding the information regarding the new event, if the informational value of the new event is greater than the informational value of the equivalent logged event, replacing the relevant event in the event log with the new event for display.

Preferably the method includes the steps of determining if a new event is a network performance event for the relevant device;

if it is, determining if a relevant timer is currently running;

if the timer is running, discarding the new event;

determining if there is a slow server event in an event log for the device;

if there is a slow server event logged for the device, end;

if there is not a slow server event logged for the device, replacing the last network service performance event in the event log with a new slow server event;

if the timer is not running, setting the timer to count for a predetermined time and then log the new event and end;

if a new event is not a network performance event for the relevant device, log the new event in the event log and end.

Preferably the method includes a step of passing said information on to a further event processor if the information passed to the first event processor relates to a type of event not processed by the first event processor.

Preferably the method includes determining the topology of the network and using knowledge of the topology of the network to stop events about IP pings being logged in an event log except events from a first network device which stopped functioning.

Preferably the method includes detecting multiple events from a single device, discarding them and logging a single event into the log indicating that there is a problem with the device.

Preferably the method includes including determining high utilisation events and allowing only high utilization events to be displayed in the log, and discarding or replacing other events.

Preferably the method includes determining when a device reboots, and processing the information to allow only a 'reboot' message to be displayed.

Preferably the method includes determining a high level of broadcasts on a segment of the network, processing the information relating to these events and discarding the individual 'high broadcast' events and logging a single event indicating that the broadcasts are high.

Preferably the method includes determining if a single event occurs repeatedly, processing the information relating to these events and discarding subsequent occurrences of the event so that a single event is logged indicating to the user that there is an ongoing problem.

Preferably there are provided a plurality of said event processors arranged in series, each event processor being adapted to process different types of event, so that information which is not of a type to be processed by a particular event processor is passed to a subsequent event processor.

Preferably the last event processor in the series causes the information to be displayed if the information is not of a type to be processed by that event processor.

According to a further aspect the invention provides a monitor for monitoring a network, said monitor comprising:

a network event monitor for monitoring the network to determine network events, a network event processor for processing network events to reduce the number of events to be displayed means for passing information regarding a network event to the event processor, means for determining if the information passed to the event processor relates to a type of event processed by that event processor, and the event processor processing said information if information on a related event has already been received by that event processor.

According to a further aspect the invention provides a monitor for monitoring a network, said monitor comprising:

a network event monitor for monitoring the network to determine network events, a plurality of network processors adapted to be used in series, said network event monitor being adapted to pass information regarding a network event to a first event processor, the first event processor being configured to determine if the information passed to it relates to a type of event processed by that first event processor, whereby the first event processor processes said information in the first event processor if the information received relates to a type of event processed by said first event processor, and the first event processor passes said information on to a second event processor if the information received does not relate to a type of event processed by said first event processor.

BRIEF DESCRIPTION OF THE DRAWINGS

Preferred embodiments of the invention will now be described by way of example and with reference to the accompanying drawings in which:

FIG. 5 is a pair of tables showing how the invention and the prior art deal with events in the part of the network shown in FIG. 4A.

DESCRIPTION OF THE PREFERRED EMBODIMENTS

Figure 4:
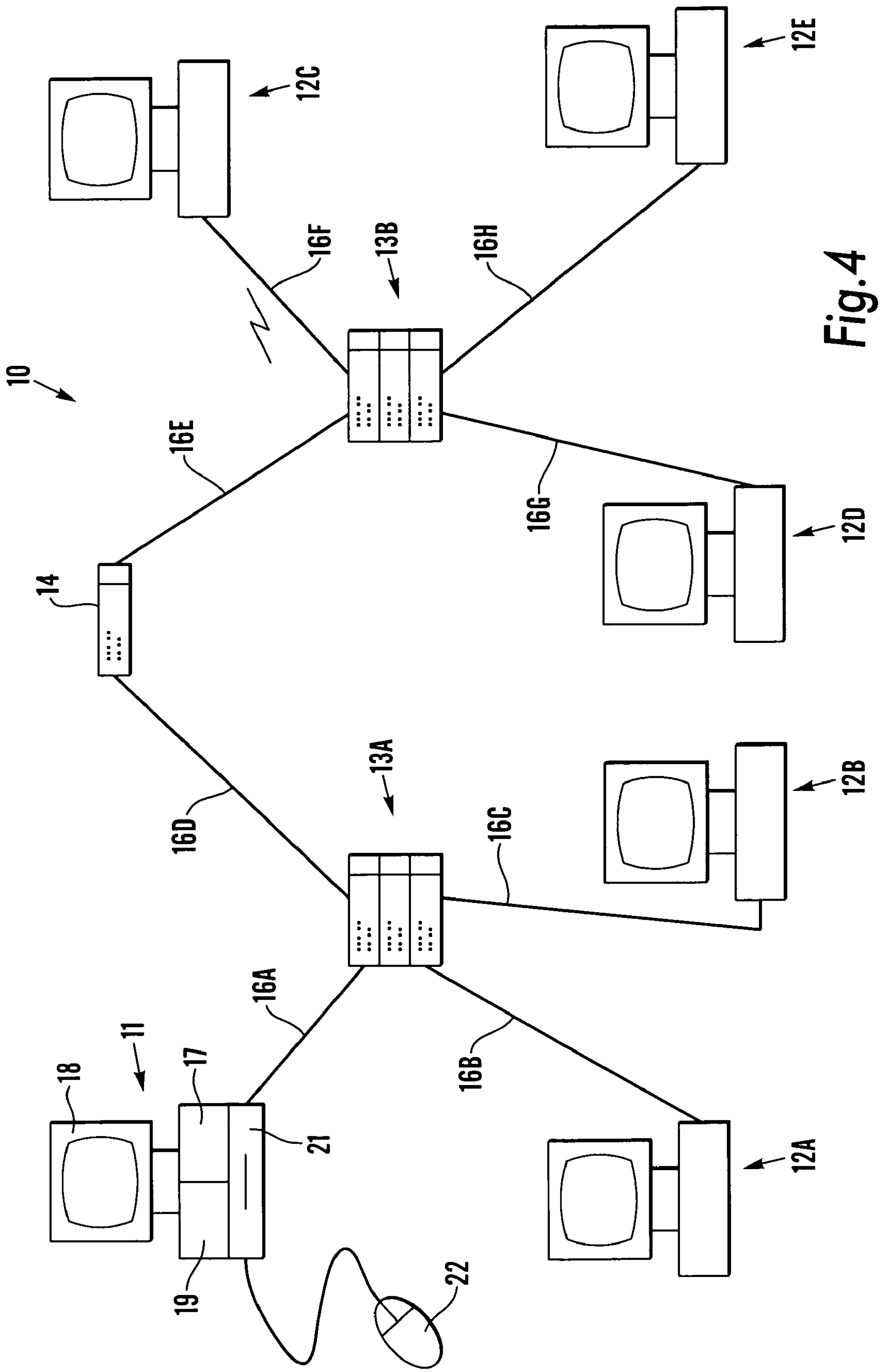
FIG. 4 is a diagrammatic view of part of a network incorporating a preferred embodiment of the invention and FIG. 4A is a detail of part of the network of FIG. 4.

Referring to FIG. 4 there is shown a physical network 10 comprising a plurality of devices in the form of a network supervisor's workstation or computer 11, other workstations 12A–E, hubs 13A, 13B, switch 14. The network is a simple network and is set out for purposes of illustration only. Other configurations and arrangements may be used.

The devices are connected together by means of links 16A–H which may be hard wired and utilise any desired protocol, and link 16F which is a wireless link.

The network supervisor's workstation includes, in addition to a visual display unit 18, a central processing unit or signal processor 19, a selector which may be in the form of a mouse 22, a program store 21 which may comprise, for example, a CD drive, a floppy disk drive or a zip drive, and a memory 17 for storing a program which may have been loaded from the program store 21 or downloaded for example via Internet from a website.

To discover the network, using a protocol such as SNMP, the network supervisor's computer 11 interrogates each device at regular intervals, and analyses the network, and stores in the memory 17 the information relating to the type of each device within the network, the number of devices, and the links between the devices. In essence, many devices include a so-called agent which stores information about the device such as its unique MAC address, its SNMP sysObjectId (which identifies what the device is), what model type it is, how many ports it has and how they are connected, and the MAC address of the origin of the data which at least some of the ports have received and hence to which they are directly or indirectly connected. The computer 11 interrogates the agents of each device to obtain the said information.

In a preferred arrangement, the computer 11 may, on command from the selector 22, process signals from the memory 17 by the signal processor 19 and provide on the visual display unit 18 a network map showing each of the devices and the links therebetween.

When there are problems with the network, events relating to these network problems are generated by the software which provides on the network manager's computer a display of these events in the form of a list or log. Hitherto, the events have been produced by the relevant software and displayed on the network manager's screen without any interpretation or amendment of the events indicated.

In a preferred aspect of the invention we will describe a method, which may be provided in the form of software on the network manager's computer or elsewhere on the system, for example, at the server, which software will provide a series of sub-programs or sub-algorithms which we will refer to as event processors which will be used to process the information.

Figure 1:
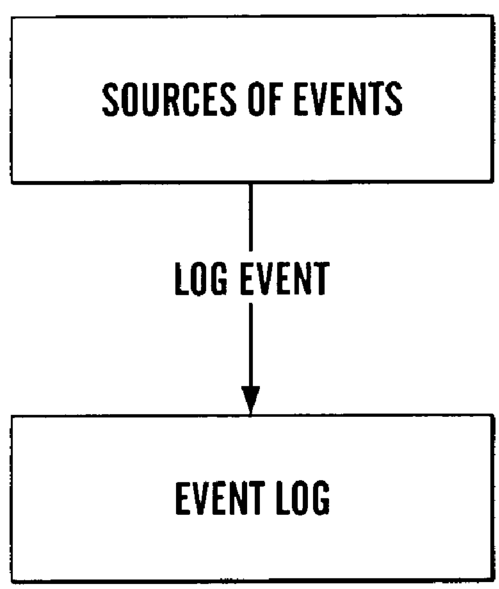
FIG. 1 is a flowchart showing a prior art method for displaying events.
Figure 2:
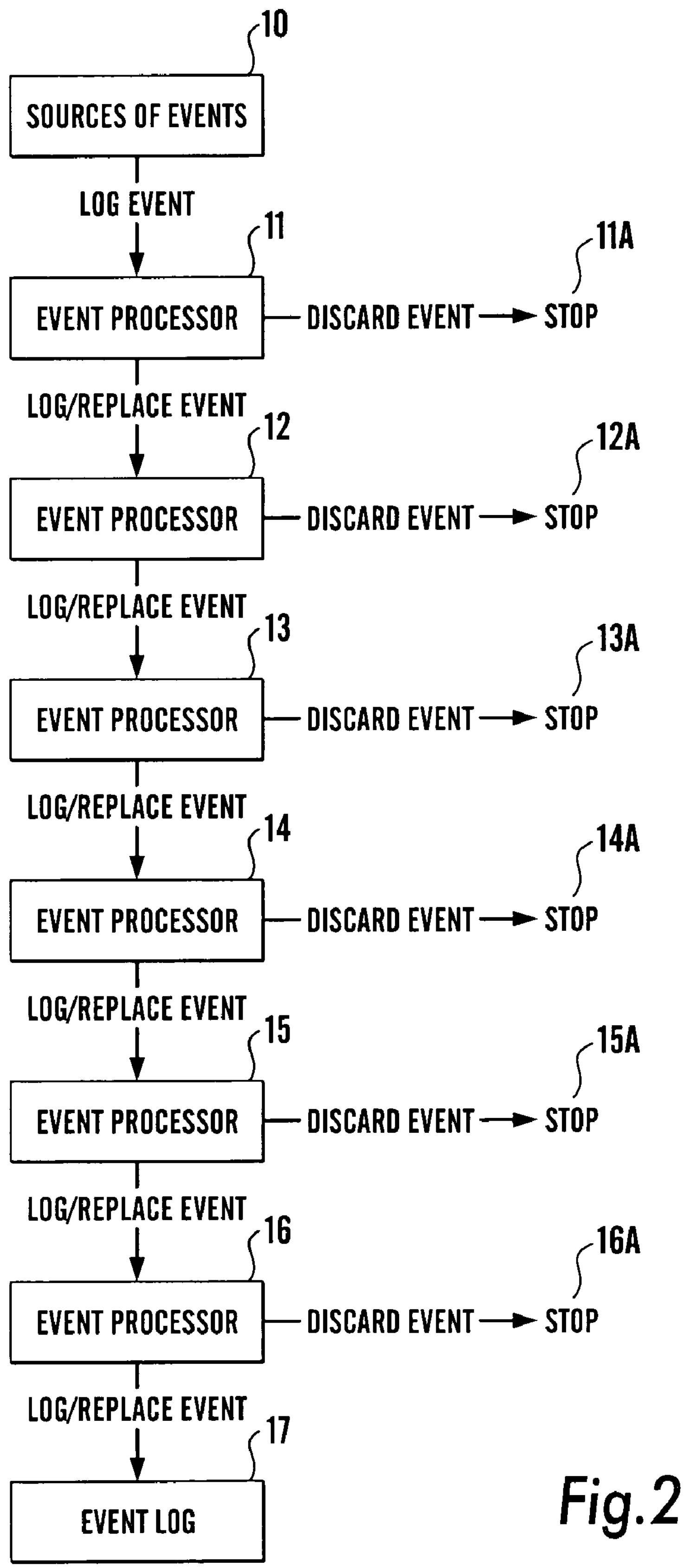
FIG. 2 is a summary flowchart of the method according to a preferred embodiment of the invention.

FIG. 2 shows the method (algorithm) in accordance with one preferred aspect of the invention for processing events. In this figure there are provided one or more event sources 10, which may be provided by the procedures outlined above. A number of event processors 10, 11, 12, 13, 14, 15, 16 are arranged in series (in reality there may be more or fewer event processors than are shown in this diagram). Each event processor is responsible for manipulating the event information relating to a particular kind of event or network problem. For example, one event processor is responsible for handling events relating to a congested link, and another handles events related to the reboot of a device on the network. The details of events handled by each event processor 11 to 16 will be described later.

In order to present or display the events in an event log 17 in the most effective way to the user, the event processor may 'hide' certain types of event from the event log by discarding them or by 'replacing' them in the event log with another event.

When information relating to an event E is produced by one of the event sources (sometimes as a result of the interrogation referred to above), the relevant information on the event is passed to the first event processor 10 and subsequently to the succession of event processors 11 to 16 in turn. Normally, each event processor will firstly determine if the information relates to the type of event which its algorithm is set up to process, will process the information if it is, and will simply pass the information onto the next event processor if it is not. The processing of the event information by an event processor might lead to it being discarded at 11A, 12A, 13A, 14A, 15A, 16A, as will be made clear later. If it is not discarded by one of the event processors (as will be explained hereafter), the information (or a modified version of the information) will eventually pass all of the event processors and arrive at the event log 17 which will display the relevant event to the user.

In accordance with its relevant algorithm, when an event processor is passed an event either by a source of events, or by another event processor, it may do one of the following with the event:

(a) determine that the event should be logged, and pass the event onto the next event processor or onto the event log 17 as appropriate. The event processor may decide to do this either because the event is not relevant to the algorithm for that event processor, or because the algorithm determines that the event is of sufficient interest to the user that it should be logged.

(b) determine that the event information should be discarded and discard it (in which case no other 'event processors' can receive and process it). An event is discarded by an event processor if the processor's algorithm determines that the event does not add any additional information to the user over and above the events which have already previously been logged.

(Note that the event processor keeps internal 'state' information, i.e. it can store any information it needs in variables or lists as it requires. For example it stores information on previous events of the type which relevant to its algorithm and refers to this previous event information when processing subsequent events. However, as an alternative, the event processor could interrogate the event log itself in order to do it's processing.

(c) determine that the event should be logged, but that it should replace an existing event R in the event log. If the processor makes this decision, then the event is passed onto the next event processor or onto the event log 17 as appropriate, but when the event reaches the event log, the event R is replaced (i.e. overwritten) with the new event and thus R is no longer visible. Typically, event processors replace events when the algorithm determines that the new event effectively supersedes the event R, i.e. the new event provides a more meaningful description of the underlying network problem than the event R. Therefore, when the new event is displayed, there is no longer any point in displaying the event R.

(d) when processing new events coming from event sources/other event processors as described above, an event processor may choose to create new events (in this sense it can act as an event source). However, unlike event sources, the events created by an event processor are passed directly to the next event processor or to the event log, rather than being passed to the first event processor in the chain of event processors. When an event processor creates an event like this, it may optionally decide that the new event will replace an existing event R (similar to the decision (c) above). Typically, the algorithm for an event processor would create a new event if it determined, based on previous events passed to the event processor, that a new event would give the most accurate description of current conditions on the network.

There are aspects of the scheme described which make it particularly useful.

Firstly, since event processing is completely separate from the generation of events, the event generation code does not have to be specially adapted to perform the event processing. Secondly, every event processor interacts with the rest of the system in the same way, i.e. each event processor accepts new events, and either discards them or passes them onto the next event processor.

Thirdly the algorithm used by each event processor is entirely independent of the algorithm used by another event processor. These properties make the system flexible, since it is straightforward to add and remove event processors to the list of processors without breaking the system.

A typical, useful set of event processors is illustrated in FIG. 2 and perform the following functions i.e. processes information on the following events as follows:

- Event processor 11. If one device on the network stops functioning, this may cause multiple devices to stop responding to the interrogation procedure of the network manager's computer, i.e. stop responding to IP pings. This would cause events to be logged in respect of the multiple devices. Thus the first event processor 11 uses knowledge of the topology of the network (known as a result of the process of discovery referred to above) to stop events about IP pings being logged except events from the first device which stopped functioning.
- Event processor 12. If multiple services (e.g. FTP, NFS, DNS) on a particular device stop responding, or are slow to respond, then this indicates a problem with the device. Thus the second event processor 12 detects multiple events from a single device, discards them and logs a single event into the log indicating that there is a problem with the device.
- Event processor 13. If a link is congested, multiple events may be generated (e.g. high utilisation, high errors, high collisions, high port discards). Thus the third event processor 13 only allows the high utilization event to be displayed in the log, and other events are discarded or replaced.
- Event processor 14. When a device reboots, multiple events can be displayed (e.g. SNMP reboot trap received, device stops responding, etc.). Also the device may stop responding for a while. Thus the fourth event processor 14 ensures that only the 'reboot' message is displayed.
- Event processor 15. If multiple devices report a high level of broadcasts on a segment of the network, then the fifth event processor 15 processes the information relating to these events and the individual 'high broadcast' events are discarded and a single event is logged indicating broadcasts are high.
- Event processor 16. If a single event occurs repeatedly (e.g. the same devices stops responding over and over again), then the sixth event processor 16 processes the information relating to these events and subsequent occurrences of the event are discarded, and a single event is logged indicated to the user that there is an ongoing problem with the device.

The order of event processors in this series is significant, since if one event processor discards an event, then the event will not be seen by the event processors further down the chain. For example, the sixth event processor 16 above which detects the same event occurring repeatedly has to be the last processor in the chain, since other processors can discard events or generate new events (like the second event processor) which have to processed by the sixth event processor. Similarly, the fourth event processor 14 (discarding events associated with the reboot of a device) might rely on the fact that the first event processor 11 will already have discarded certain events caused by the reboot of the device.

We will now set out details of some of the event processors.

Third Event Processor 13

If a link becomes "busy" or congested with network traffic, this can trigger the generation of more than one event. For example, a congested link could cause "high utilization", "high collisions", "high fragments" and "high discards" events to be logged. This third event processor ensures that no more than one event is ever logged in this case.

Figure 3:
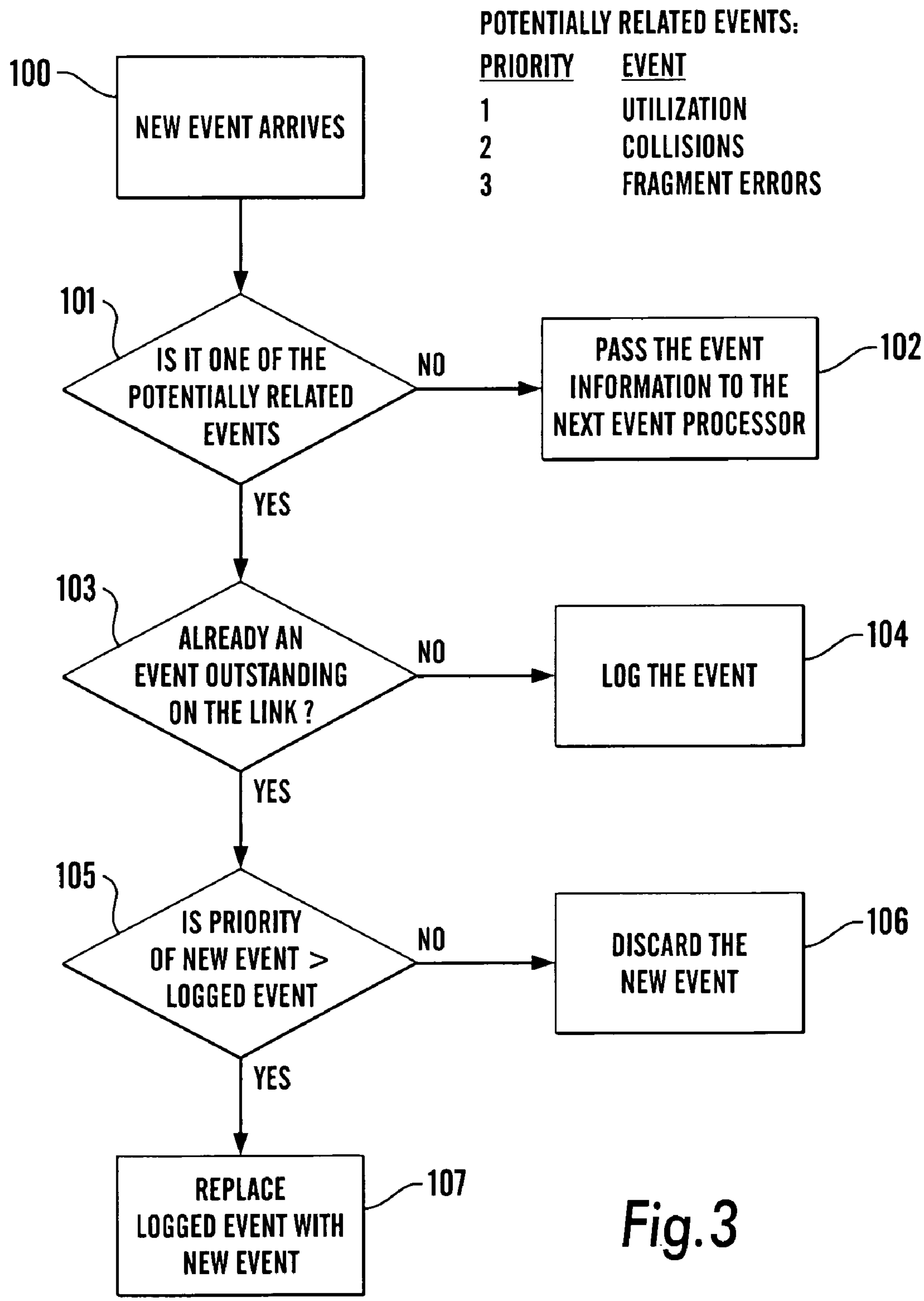
FIG. 3 is a flowchart showing a detail of part of FIG. 2.

The third event processor 13 uses the algorithm shown in FIG. 3. The event "types" (utilization, collisions, fragments, etc) that can be triggered by a congested link are of different informational value to the user. The different informational values (referred to as "priority" in FIG. 3) depend upon how meaningfully the event describes the problem. In this case, "high utilization" is given has the highest informational value (the highest priority) as this describes the problem better than "high collisions", "high fragments" or "high discards". An event with a high informational value will be logged in preference to one with a lower informational value. This results in "high utilization" events being logged in preference to "high collisions" and "high fragments" events.

Take for example the case where link congestion causes, in time order, a "high collisions" event, then a "high utilization" event, then a "high fragments" event to be raised. First of all, the "high collisions" event will be displayed in the event log. Then when the "high utilization"

event arrives, because it has a higher informational value (priority) than the "high collisions" event, it replaces it in the event log. Then when the "high fragments" event arrives, because it is of lower informational value, it is simply discarded. Thus, this leaves only the "high utilization" event in the user's event log.

FIG. 3 shows an algorithm for the event processor. The program steps will be set out as follows.

Program step 100, new event arrives from event source.

Program step 101, is the new event one of potentially related events?

Program step 102, if the answer in program step 101 is no, pass the event information to the next event processor.

Program step 103, if the answer in step 101 is yes, is there already an event outstanding on this link?

Program step 104, if the answer in program step 103 is no, log the event.

Program step 105, if the answer in program step 103 is yes, is the priority (informational value) of the new event greater than the priority (informational value) of the equivalent logged event?

Program step 106, if the answer in program step 105 is no, discard the information regarding new event.

Program step 107, if the answer in program step 105 is yes, replace the relevant logged event with the new event.

Thus in program step 101, the event processor 13 determines whether or not the newly received information relates to a type of event which might relate to other events. If the answer is no, then the information is passed to the next event processor 14, but if the answer is yes, then in program step 103 the event processor 13 searches to find whether the same sort of event relating to this relevant link is already outstanding and logged. If the answer to that is no, then the relevant information is passed on to the next event processor 14 (or to the event log 17 in the case where that was next to the event processor 13). If the answer is yes, then in program step 105, the event processor 13 determines whether or not the new event has a greater informational value than the logged event. There may be some different levels of informational value, the highest level of informational value might relate to utilisation of the device, the second highest level of informational value might relate to collisions in the link, and the lowest level of informational value might relate to fragment errors.

If the informational value of the new event is greater than the event which has already been logged, then the event which has already been logged is replaced with the new event.

The algorithm, as presented, only concerns the events from a single link. In an actual implementation of the event processor, it is trivial to implement the algorithm so that it these rules are separately applied for every link on the network.

Second Event Processor 12

Figure 4A:
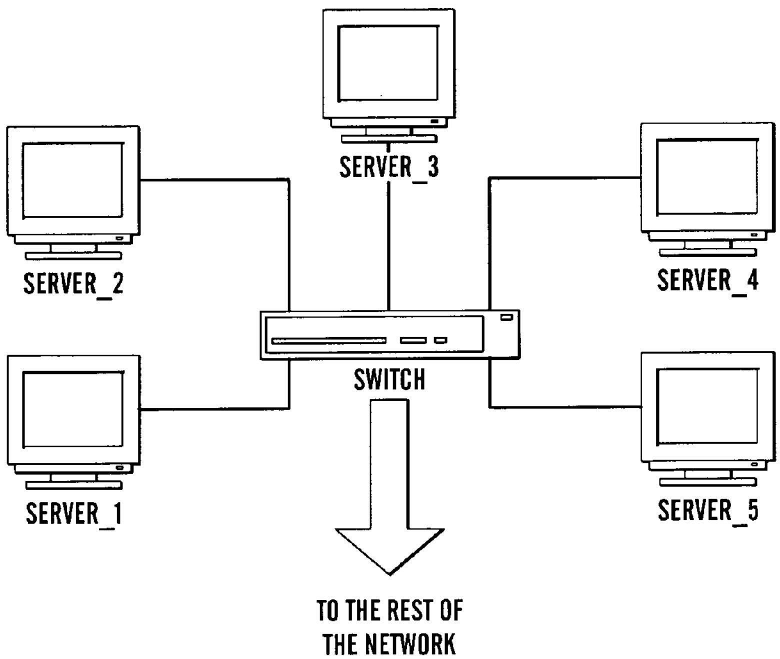

Consider a server on a network. Network performance is measured by how quickly it is able to respond to requests for different types of traffic such as FTP (file transfer), HTTP (web page), SMTP (e-mail) and so on. If one type of traffic slows down, this could indicate that a sub-system within the server is experiencing problems. However, if a number of types of traffic start to slow down the problem is obviously having an effect on the entire server. In traditional systems, this server-wide slow down will still be presented as a number of discrete events. The task of correlating these events may be simple enough when one server is involved but often servers are grouped together into server 'farms' (see FIG. 4A which shows a switch 30 connected as shown to servers 1, 2, 3, 4, 5). If the switch 30 in the middle of the server farm started to slow down (thereby affecting the performance of the attached servers), traditional network management solutions would then start to log scores of events as the slow-down of each network service on each server was reported as a separate event.

The second event processor 12 in accordance with a preferred embodiment of the invention overcomes this problem by logging only one "slow server" event in place of numerous network service performance events (see FIG. 5 which shows an event log or list for such an event, the top list being that provided without the use of an event processor and the lower list being for the same event with the use of the second type of event processor). It works by intercepting the new event before it is added to the event list. The algorithm of the event processor checks to see if a network service event has already been added for this device in the past five minutes. If it has, the existing event is replaced in the list with a "slow server" event. Once the "Slow Server" event has been logged, any new network service performance events for that particular end station are intercepted up to five minutes from when the first network service performance event was seen. The interception process only stops when no network service problems have been seen five minutes after the last event.

Figure 6:
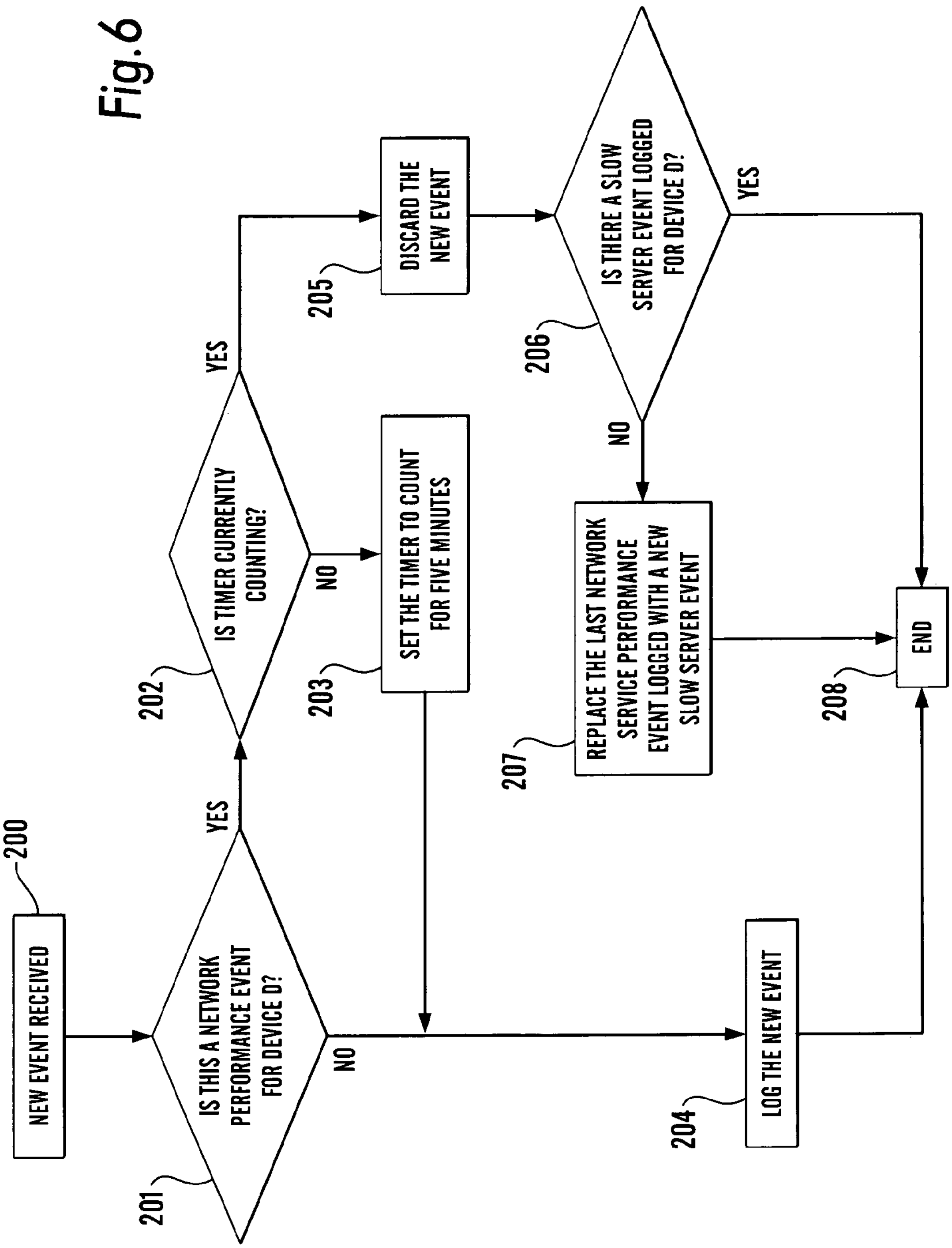
FIG. 6 is flowchart showing a part of FIG. 2.

This entire program or algorithm used by the second event processor 12 is presented in FIG. 6. The algorithm as presented only processes the events for a single device D, but it is assumed that a real implementation would be adapted so that the whole algorithm is applied to every device on the network.

Program step 200, new event arrives.

Program step 201, determine if this is a network performance event for relevant device D?

If no, go to program step 204, log the new event (as previously described, logging a new event may result in the event being passed to another event processor, or it being passed directly to the event log, depending on the position of this event processor in the chain of event processors), If yes, go to program step 202, and determine if the timer is currently running?

If yes, go to program step 205,

If no, go to program step 203, set the timer to count for a predetermined time (e.g. five minutes) and go to step 204, Program step 20, log the new event and go to program step 208 (end)

Program step 205, discard the new event and go to program step 206.

Program step 206, determine if there is a slow server event logged for device D?

If yes, go to program step 208,

If no, go to program step 207, replace the last network service performance event logged with a new slow server event (the new event may be passed to other event processors, or may be passed directly to the event log, depending on the position of this event processor in the chain of event processors)

Program step 208, end.

The invention is not restricted to the details of the foregoing examples.

What is claimed is:

1. A method of monitoring a network, comprising:

(a) receiving information relating to network events;

(b) passing information regarding a network event to a first of a series of event processors;

(c) determining in the event processor if the information relates to a type of event processed by that event processor;

(d) if it is of such a type, processing said information including discarding the information if information on a related event, having the same or greater informational value to a user, has already been received and processed by that event processor; and (e) if it is not of such a type, passing the information to the next event processor in the series of event processors and repeating steps (c) (d) and (e) at the next event processor in the series of event processors.

2. A method as claimed in claim 1 including monitoring said network to determine network events.

3. A method as claimed in claim 2 in which the network is monitored using Internet Control Management Protocol (ICMP) ping.

4. A method as claimed in claim 2 in which the network is monitored using Simple Network Management Protocol (SNMP).

5. A method as claimed in claim 1 in which said processing step (d) includes processing said information by discarding the information if information on a related event has been received by that event processor within a predetermined preceding period of time.

6. A method as claimed in claim 1 in which the information is displayed and/or logged and the discarding of the information in the processing step (d) comprises not displaying and/or logging that information.

7. A method as claimed in claim 1 including the steps of determining if a new event is a network performance event for the relevant device;

if it is, determining if a relevant timer is currently running;

if the timer is running, discarding the new event;

determining if there is a slow server event in an event log for the device;

if there is a slow server event logged for the device, end;

if there is not a slow server event logged for the device, replacing the last network service performance event in the event log with a new slow server event;

if the timer is not running, setting the timer to count for a predetermined time and then log the new event and end;

if a new event is not a network performance event for the relevant device, log the new event in the event log and end.

8. A method as claimed in claim 1 including determining the topology of the network and using knowledge of the topology of the network to stop events about IP pings being logged in an event log except events from a first network device which stopped functioning.

9. A method as claimed in claim 1 including detecting multiple events from a single device in the network, discarding them and logging a single event into the log indicating that there is a problem with the device.

10. A method as claimed in claim 1 including determining high utilization events and allowing only high utilization events to be displayed in the log, and discarding or replacing other events.

11. A method as claimed in claim 1 including determining when a device reboots, and processing the information to allow only a 'reboot' message to be displayed.

12. A method as claimed in claim 1 including determining a high level of broadcasts on a segment of the network, processing the information relating to these events and discarding the individual 'high broadcast' events and logging a single event indicating that the broadcasts are high.

13. A method as claimed in claim 1 including determining if a single event occurs repeatedly, processing the information relating to these events and discarding subsequent occurrences of the event so that a single event is logged indicating to the user that there is an ongoing problem.

14. A method as claimed in claim 1 in which the last event processor in the series causes the information to be displayed if the information is not of a type to be processed by that event processor.

15. A method as claimed in claim 1 in which step (d) includes displaying event information which is not discarded.

16. The method as claimed in claim 1, wherein if the information is of a type that is not processed by a last event processor of the series of event processors, after receiving the information the last event processor causes the information to be diplayed.

17. A computer program stored on a computer readable medium loadable into a digital computer, said computer program operating in accordance with the method of claim 1.

18. A method of monitoring a network, the method comprising the steps of, on receipt of information at a first event processor of a series of event processors, the information relating to a new network event, determining if the new event is one of potentially related events processed by the first event processor;

if it is not, passing the event information to the next event processor of the series of event processors or an event log for display;

if it is, determining if there is already an event outstanding on a link to which the event relates;

if there is not already an event outstanding on the link to which the event relates, passing the event information to the next event processor of the series of event processors or the event log for display;

if there is already an event outstanding on the link to which the event relates, determining if the informational value of the new event is greater than the informational value of the equivalent event in the event log;

if the informational value of the new event is not greater than the informational value of the equivalent event in the event log, discarding the information regarding the new event; and if the informational value of the new event is greater than the informational value of the equivalent logged event, replacing the relevant event in the event log with the new event for display.

19. A method of processing network events to reduce the number of events to be displayed, comprising:

receiving information relating to network events;

passing information regarding a network event to a first event processor of a plurality of event processors, wherein each of the plurality of event processors passes information along according to a given series arrangement;

determining if the information passed to the first event processor relates to a type of event processed by the first event processor;

processing said information in the first event processor if the information received relates to a type of event processed by the first event processor, wherein processing said information includes discarding said information if information on a related event having the same or greater information value to a user has already been received and processed by the first event processor, whereby the event relating to the discarded information is not displayed; and passing said information on to a further event processor according to the given series arrangement if the information received does not relate to a type of event processed by the first event processor.

20. A method as claimed in claim 19 including monitoring said network to determine network events.

21. A method as claimed in claim 19 in which the network is monitored using Internet Control Management Protocol (ICMP) ping.

22. A method as claimed in claim 19 in which the network is monitored using Simple Network Management Protocol (SNMP).

23. A method as claimed in claim 19 including the steps of, on receipt of information relating to a new event, determining if the new event is one of potentially related events;

if it is not, passing the event information to the next event processor in a series of event processors or an event log for display;

if it is, determining if there is already an event outstanding on the link to which the event relates;

if there is not already an event outstanding on the link to which the event relates, passing the event information to the next event processor in the series of event processors or the event log for display;

if there is already an event outstanding on the link to which the event relates, determining if the informational value of the new event is greater than the informational value of the equivalent event in the event log;

if the informational value of the new event is not greater than the informational value of the equivalent event in the event log, discarding the information regarding the new event; and if the informational value of the new event is greater than the informational value of the equivalent logged event, replacing the relevant event in the event log with the new event for display.

24. A method as claimed in claim 19 including the steps of determining if a new event is a network performance event for the relevant device;

if it is, determining if a relevant timer is currently running;

if the timer is running, discarding the new event;

determining if there is a slow server event in an event log for the device;

if there is a slow server event logged for the device, end;

if there is not a slow server event logged for the device, replacing the last network service performance event in the event log with a new slow server event;

if the timer is not running, setting the timer to count for a predetermined time and then log the new event and end;

if a new event is not a network performance event for the relevant device, log the new event in the event log and end.

25. A method as claimed in claim 19 including determining the topology of the network and using knowledge of the topology of the network to stop events about IP pings being logged in an event log except events from a first network device which stopped functioning.

26. A method as claimed in claim 19 including detecting multiple events from a single device, discarding them and logging a single event into the log indicating that there is a problem with the device.

27. A method as claimed in claim 19 including determining high utilization events and allowing only high utilization events to be displayed in the log, and discarding or replacing other events.

28. A method as claimed in claim 19 including determining when a device reboots, and processing the information to allow only a 'reboot' message to be displayed.

29. A method as claimed in claim 19 including determining a high level of broadcasts on a segment of the network, processing the information relating to these events and discarding the individual 'high broadcast' events and logging a single event indicating that the broadcasts are high.

30. A method as claimed in claim 19 including determining if a single event occurs repeatedly, processing the information relating to these events and discarding subsequent occurrences of the event so that a single event is logged indicating to the user that there is an ongoing problem.

31. A method as claimed in claim 19 in which there are provided a plurality of said event processors arranged in series, each event processor being adapted to process different types of event, so that information which is not of a type to be processed by a particular event processor is passed to a subsequent event processor.

32. A method a claimed in claim 31 in which the last event processor in the series passes the relevant event information to an event log to cause the information to be displayed.

33. A method as claimed in claim 19 in which said processing step includes processing said information according to whether information on a related event has already been received by that event processor.

34. A method as claimed in claim 19 in which said processing step includes processing said information by discarding the information if a related event of greater informational value to a user has already been logged or processed by that event processor.

35. A method as claimed in claim 19 in which said processing step includes processing said information by discarding the information if information on a related event has been received by that event processor within a predetermined preceding period of time.

36. A method as claimed in claim 35 in which the information is displayed and/or logged and the discarding of the information in the processing step comprises not displaying and/or logging that information.

37. A computer program stored, on a computer readable medium loadable into a digital computer, said computer program operating in accordance with the method of claim 19.

38. A monitor for monitoring a network, said monitor comprising:

a network event monitor for monitoring the network to determine network events;

a plurality of network event processors for processing network events to reduce the number of events to be displayed, wherein each of the plurality of network event processors passes information along according to a given series arrangement;

means for passing information regarding a network event to a first network event processor of the plurality of network event processor;

means for determining if the information passed to the first network event processor relates to a type of event processed by that event processor; and means for passing the information to a next network event processor of the plurality of network event processors, according to the given series arrangement, if the information received at the first network event processor does not relate to a type of event processed by the first network event processor, wherein the first network event processor processes the information, including discarding the information so that the network event associated with the information is not displayed, if information on a related event having the same or greater informational value to a user has already been received by the first network that event processor.

39. A monitor as claimed in claim 38 in which said event processor processes said information by discarding the information if information of information received does not relate to a type of event processed by the first event processor.

40. A monitor as claimed in claim 38 in which said event processor processes said information by discarding the information if information on a related event has been received by that event processor within a predetermined preceding period of time.

41. A monitor for monitoring a network, said monitor comprising:

a network event monitor for monitoring the network to determine network events; and a plurality of network event processors adapted to be used in a series arrangement, wherein the network event monitor is adapted to pass information regarding a network event to a first network processor of the plurality of network event processors; and wherein the first event processor is configured to determine if the information passed to it relates to a type of event processed by the first event processor, whereby the first event processor processes said information in the first event processor if the information received relates to a type of event processed by said first event processor, and wherein the first event processor passes said information on to a second event processor of the plurality of event processors according to the series arrangement if the information received does not relate to a type of event processed by the first event processor.

* * * * *